United States Patent
Kim

(10) Patent No.: US 12,073,095 B2
(45) Date of Patent: Aug. 27, 2024

(54) STORAGE DEVICE PERFORMING A DATA PROTECTION OPERATION AND OPERATION METHOD THEREOF

(71) Applicant: SAMSUNG ELECTRONICS CO., LTD., Suwon-si (KR)

(72) Inventor: In-Su Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 2 days.

(21) Appl. No.: 17/938,291

(22) Filed: Oct. 5, 2022

(65) Prior Publication Data
US 2023/0152987 A1 May 18, 2023

(30) Foreign Application Priority Data

Nov. 16, 2021 (KR) .................. 10-2021-0157135
Apr. 6, 2022 (KR) .................. 10-2022-0043054

(51) Int. Cl.
*G06F 3/06* (2006.01)

(52) U.S. Cl.
CPC .......... *G06F 3/0622* (2013.01); *G06F 3/0659* (2013.01); *G06F 3/0679* (2013.01)

(58) Field of Classification Search
CPC ...... G06F 3/062; G06F 3/0622; G06F 3/0623; G06F 3/0658; G06F 3/0659; G06F 3/0661; G06F 3/0679; G06F 21/554; G06F 21/602; G06F 21/6218; G06F 21/79; G06F 2221/2143
See application file for complete search history.

(56) References Cited

U.S. PATENT DOCUMENTS

| | | | |
|---|---|---|---|
| 6,782,103 B1 | 8/2004 | Arthan et al. | |
| 8,370,648 B1* | 2/2013 | Natanzon | G06F 12/1408 713/193 |
| 8,724,815 B1 | 5/2014 | Roth et al. | |
| 8,938,624 B2* | 1/2015 | Obukhov | G06F 21/6209 713/193 |
| 9,971,522 B2 | 5/2018 | Miyamoto et al. | |
| 10,496,610 B2 | 12/2019 | Orloff et al. | |
| 2004/0202329 A1 | 10/2004 | Jung et al. | |
| 2012/0072735 A1 | 3/2012 | Fukawa et al. | |
| 2012/0246463 A1 | 9/2012 | Shea et al. | |
| 2012/0331284 A1* | 12/2012 | Kouladjie | H04L 9/088 713/153 |
| 2016/0103626 A1 | 4/2016 | Hars et al. | |
| 2018/0024942 A1 | 1/2018 | Canepa et al. | |
| 2018/0189193 A1 | 7/2018 | Bernat et al. | |
| 2021/0409212 A1 | 12/2021 | Nakaide et al. | |

FOREIGN PATENT DOCUMENTS

| | | |
|---|---|---|
| CN | 113169865 | 7/2021 |
| JP | 6836410 | 3/2021 |
| WO | 2020103149 | 5/2020 |

* cited by examiner

*Primary Examiner* — Aracelis Ruiz
(74) *Attorney, Agent, or Firm* — F. Chau & Associates, LLC

(57) ABSTRACT

An operation method of a storage device which includes a nonvolatile memory device and communicates with a host based on a cryptographic key includes setting up a first key identifier and a first lifetime of a first cryptographic key based on a first command received from the host. The method further includes, after the first lifetime is expired, when a second command including the first key identifier is received from the host, performing a data protect operation on the first cryptographic key.

15 Claims, 14 Drawing Sheets

FIG. 3

| Key ID | Cryptographic Key | Remaining Lifetime | Mode | Operation |
|---|---|---|---|---|
| A | 0x123ABC | N/A | Unprotect mode | Normal |
| B | 0x123DEF | Ta | Protect mode | Normal |
| C | 0x123GHI | Tb | Protect mode | Normal |
| D | 0x123JKL | 0 | Lock mode | Error |
| E | 0x123MNO | 0 | Lock mode | Dummy Response |

FIG. 11

| Key ID | Cryptographic Key | Durability | Counter Value | Mode | Operation |
|---|---|---|---|---|---|
| F | 0x456ABC | N/A | N/A | Unprotect mode | Normal |
| G | 0x456DEF | Na | 0 | Protect mode | Normal |
| H | 0x456GHI | Nb | Nb | Protect mode | Normal |
| I | 0x456JKL | Nc | Nc+1 | Lock mode | Error |
| J | 0x456MNO | Nd | Nd+1 | Lock mode | Dummy response |

STORAGE DEVICE PERFORMING A DATA PROTECTION OPERATION AND OPERATION METHOD THEREOF

CROSS-REFERENCE TO RELATED APPLICATIONS

This application claims priority under 35 U.S.C. § 119 to Korean Patent Application No's. 10-2021-0157135 filed on Nov. 16, 2021, and 10-2022-0043054 filed on Apr. 6, 2022, in the Korean Intellectual Property Office, the disclosures of which are incorporated by reference herein in their entireties.

TECHNICAL FIELD

Embodiments of the present disclosure relate to a semiconductor memory, and more particularly, to a storage device and an operation method thereof.

DISCUSSION OF RELATED ART

A semiconductor memory device may be classified as a volatile memory, which loses data stored therein when a power supply is turned off (e.g., a dynamic random access memory (DRAM) or a static RAM (SRAM)), or a nonvolatile memory, which retains data stored therein even when a power supply is turned off (e.g., a flash memory, a phase-change RAM (PRAM), a magnetic RAM (MRAM), resistive RAM (ReRAM), or a ferroelectric random access memory (FRAM)).

A flash memory-based solid state drive (SSD) is widely used as a high-capacity storage medium. In general, an SSD communicates with a host through a given interface and a cryptographic key. For example, an SSD may be configured to encode data received from a host with a given cryptographic key and to store the encoded data.

SUMMARY

Embodiments of the present disclosure provide a storage device capable of preventing data loss and leakage even when a host is hacked, and an operation method thereof.

According to an embodiment, an operation method of a storage device which includes a nonvolatile memory device and is configured to communicate with a host based on a cryptographic key may include setting up a first key identifier and a first lifetime of a first cryptographic key based on a first command received from the host, and after the first lifetime is expires, when a second command including the first key identifier is received from the host, performing a data protect operation with regard to the first cryptographic key.

According to an embodiment, a storage device may include a nonvolatile memory device, and a storage controller that communicates with a host based on a cryptographic key and controls the nonvolatile memory device under control of the host. The storage controller may set up a first lifetime of a first cryptographic key provided from the host, and may return an error or a dummy response to the host in response to receiving a first command related to the first cryptographic key from the host after the first lifetime expires.

According to an embodiment, a storage system may include a storage device that includes a nonvolatile memory device, and a host that sends a first command for setting up a first cryptographic key, a first key identifier for the first cryptographic key, and a first lifetime of the first cryptographic key to the storage device. When an access to the first cryptographic key is requested from the host after the first lifetime expires, the storage device may return an error or a dummy response to the host.

BRIEF DESCRIPTION OF THE DRAWINGS

The above and other objects and features of the present disclosure will become apparent by describing in detail embodiments thereof with reference to the accompanying drawings.

FIG. 3 is a table illustrating the manner in which a storage controller of FIG. 2 operates based on a remaining lifetime according to an embodiment of the present disclosure.

FIG. 11 is a table illustrating how a storage controller of FIG. 10 operates based on a counter value, according to an embodiment of the present disclosure.

DETAILED DESCRIPTION

Figure 1:
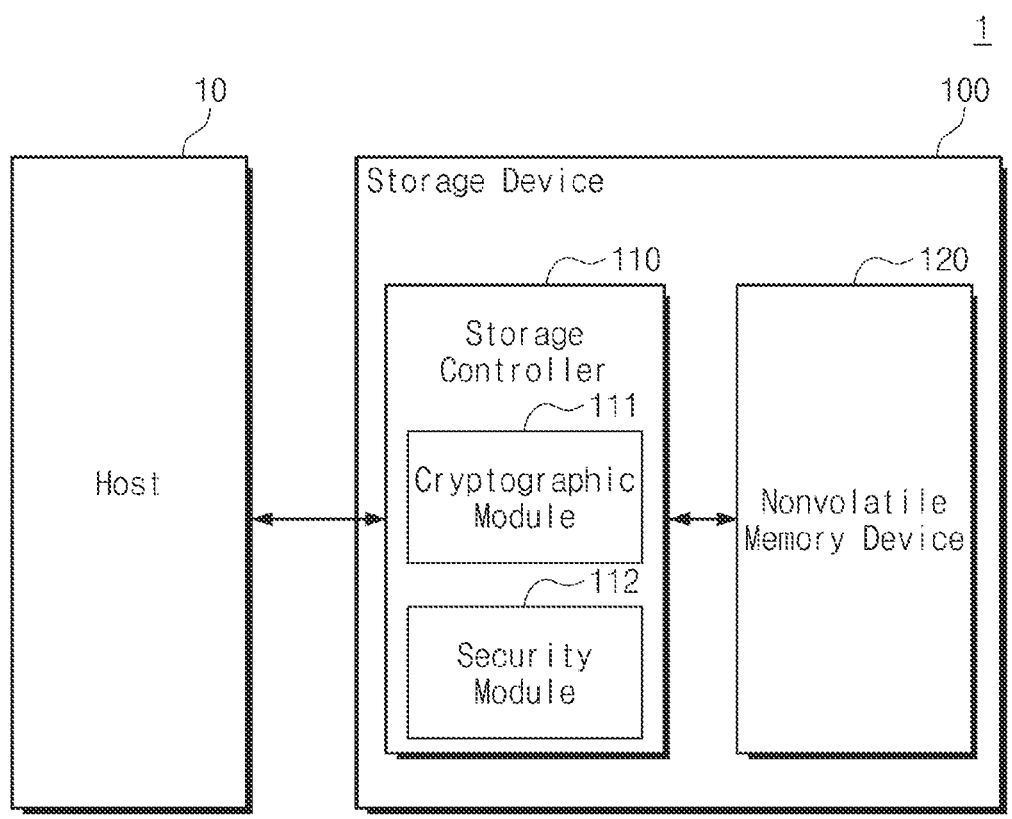
FIG. 1 is a block diagram illustrating a storage system according to an embodiment of the present disclosure.

Embodiments of the present disclosure will be described more fully hereinafter with reference to the accompanying drawings. Like reference numerals may refer to like elements throughout the accompanying drawings Components that are described in the detailed description with reference to the terms "driver", "block", etc. may be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, a micro electromechanical system (MEMS), a passive element, or a combination thereof.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram illustrating a storage system according to an embodiment of the present disclosure.

Referring to FIG. 1, a storage system 1 may include a host 10 and a storage device 100. In an embodiment, the storage system 1 may include at least one of various information processing devices such as, for example, a personal computer, a laptop computer, a server, a workstation, a smartphone, and a tablet PC.

The host 10 may access the storage device 100. For example, the host 10 may send a command to the storage device 100 to store data in the storage device 100 or to read data stored in the storage device 100.

The storage device 100 may include a storage controller 110 and a nonvolatile memory device 120. The storage device 100 may operate under control of the host 10. For example, based on a command issued from the host 10, the storage controller 110 may store data in the nonvolatile memory device 120 or may read data from the nonvolatile memory device 120.

In an embodiment, the storage device 100 may communicate with the host 10 based on, for example, a Peripheral Component Interconnect express (PCI-express) interface or a PCI-express based Nonvolatile Memory Express (NVMe) interface. However, embodiments of the present disclosure are not limited thereto. For example, the storage device 100 and the host 10 may be implemented with various interfaces such as, for example, an Advanced Technology Attachment (ATA) interface, a Serial ATA (SATA) interface, an external SATA (e-SATA) interface, a Small Computer Small Interface (SCSI), a Serial Attached SCSI (SAS) interface, a Peripheral Component Interconnection (PCI) interface, an IEEE 1394 interface, a Universal Serial Bus (USB) interface, a Secure Digital (SD) card interface, a Multi-Media Card (MMC) interface, an embedded Multi-Media Card (eMMC) interface, a Universal Flash Storage (UFS) interface, an embedded Universal Flash Storage (eUFS) interface, and a Compact Flash (CF) card interface.

The storage controller 110 may communicate with the host 10 by using a cryptographic key. For example, the storage controller 110 may include a cryptographic module 111. Based on the cryptographic key, the cryptographic module 111 may encode data to be stored in the nonvolatile memory device 120 or may decode data read from the nonvolatile memory device 120.

For example, the storage controller 110 may receive raw data from the host 10. The cryptographic module 111 may encode the received raw data with the cryptographic key, and the storage controller 110 may store the encoded data in the nonvolatile memory device 120. The cryptographic module 111 may decode data read from the nonvolatile memory device 120, and the storage controller 110 may provide the decoded data (e.g., raw data) to the host 10.

In an embodiment, the storage controller 110 may communicate with the host 10 based on a plurality of cryptographic keys. In this case, the plurality of cryptographic keys may be different from each other. The plurality of cryptographic keys may respectively correspond to different regions of the nonvolatile memory device 120.

The host 10 may determine a lifetime of a cryptographic key. That is, the storage controller 110 may set up a lifetime of a cryptographic key under control of the host 10. For example, the storage device 100 may include a security module 112. The security module 112 may set up a lifetime of each of a plurality of cryptographic keys under control of the host 10. The security module 112 may allow the storage controller 110 to perform a data protect operation on a cryptographic key whose lifetime expires.

For example, a first command (e.g., a read command or a write command) provided from the host 10 to the storage controller 110 may include a first key identifier (Key ID) corresponding to the first cryptographic key. In this case, the security module 112 may identify the first cryptographic key corresponding to the first key identifier included in the first command. The security module 112 may determine whether a lifetime of the first cryptographic key that has been identified expires. That is, the security module 112 may determine whether the lifetime of the first cryptographic key related to the first command received from the host 10 expires.

When it is determined that the lifetime of the first cryptographic key does not expire, the security module 112 may allow the storage controller 110 to perform a normal operation. In this case, the cryptographic module 111 may encode or decode data by using the first cryptographic key. The storage controller 110 may store the encoded data in the nonvolatile memory device 120 or may send the decoded data to the host 10.

However, when it is determined that the lifetime of the first cryptographic key expires, the security module 112 may allow the storage controller 110 to return an error or a dummy response to the first command. In this case, even in a case in which, for example, the host 10 is hacked, data stored in the storage device 100 may be protected.

For example, when the first command is the read command, the storage controller 110 may return an error or garbage data to the host 10. In this case, the garbage data may not be related to data stored in the nonvolatile memory device 120 or may be randomly generated data. In contrast, when the first command is the write command, the storage controller 110 may return an error to the host 10, or the storage controller 110 may return a completion acknowledgment to the host 10 and may not write data in the nonvolatile memory device 120. As in the above description, when the first command is an erase command, the storage controller 110 may return an error to the host 10, or the storage controller 110 may return a completion acknowledgment to the host 10 and may not erase stored data in the nonvolatile memory device 120.

That is, as the storage device 100 returns an error or a dummy response to the hacked host, data stored in the nonvolatile memory device 120 may be protected. Accordingly, according to an embodiment of the present disclosure, the security of the storage device 100 may be increased. A configuration of the security module 112 and an operation of the storage device 100 will be described in detail with reference to the following drawings.

Figure 2:
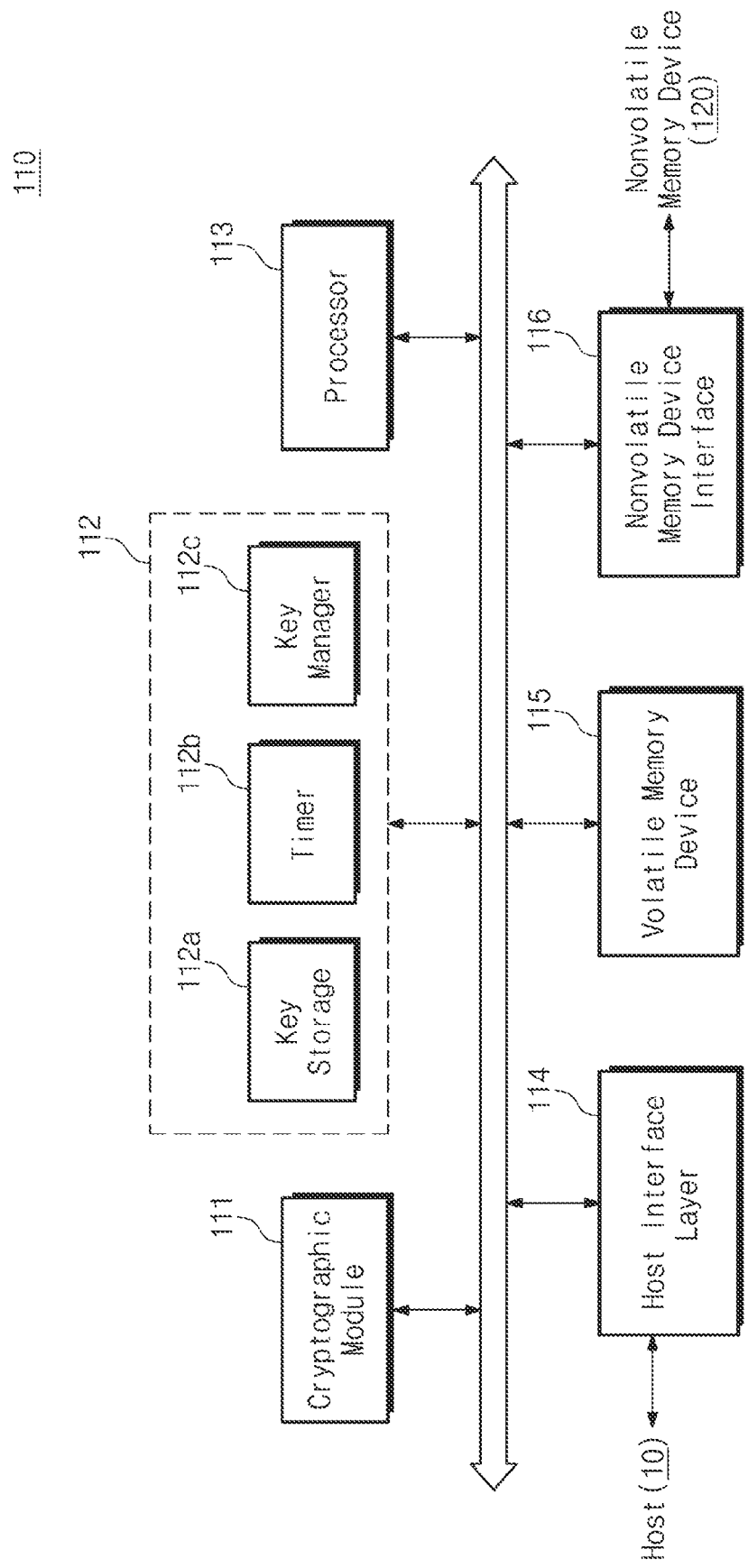
FIG. 2 is a block diagram illustrating a storage controller of FIG. 1 according to an embodiment of the present disclosure.

FIG. 2 is a block diagram illustrating a storage controller of FIG. 1 according to an embodiment of the present disclosure.

Referring to FIGS. 1 and 2, the storage controller 110 may include the cryptographic module 111, the security module 112, a processor 113, a host interface layer 114, a volatile memory device 115, and a nonvolatile memory device interface 116. The security module 112, the processor 113, the host interface layer 114, the volatile memory device 115, and the nonvolatile memory device interface 116 may be connected to each other via a bus.

The processor 113 may control an overall operation of the storage controller 110. For example, the processor 113 may execute various applications (e.g., a flash translation layer (FTL)) on the storage controller 110.

The storage controller 110 may communicate with the host 10 through the host interface layer 114. In an embodiment, the host interface layer 114 may include at least one of various host interfaces such as, for example, a Peripheral Component Interconnect express (PCI-express) interface, a nonvolatile memory express (NVMe) interface, a Serial ATA (SATA) interface, a Serial Attached SCSI (SAS) interface, and a Universal Flash Storage (UFS) interface. For brevity of description, below, it is assumed that the host interface layer 114 communicates with the host 10 based on the PCI-express interface.

The volatile memory device 115 may be used as, for example, a working memory, a buffer memory, or a cache memory of the storage controller 110. For example, the volatile memory device 115 may be implemented with a static random access memory (SRAM) or a dynamic random access memory (DRAM).

The storage controller 110 may communicate with the nonvolatile memory device 120 through the nonvolatile memory device interface 116. For example, the nonvolatile memory device interface 116 may be a NAND interface.

The security module 112 may set up, store, and manage a lifetime of a cryptographic key that is used for communication with the host 10. For example, the security module 112 may include key storage 112a, a timer 112b, and a key manager 112c.

The key storage 112a may store a variety of information related to a cryptographic key that is used for communication with the host 10. For example, the key storage 112a may store a cryptographic key, a key identifier (Key ID) for the cryptographic key, and information about a lifetime of the cryptographic key.

In an embodiment, the key identifier may be used to call the corresponding cryptographic key. For example, the host 10 may send various types of commands, such as a read command and a write command, to the storage device 100. In this case, the host 10 may include the corresponding key identifier instead of directly including the cryptographic key in the command to be sent. The storage device 100 may perform various operations (e.g., a read operation and a write operation) on the nonvolatile memory device 120 based on the key identifier included in the command provided from the host 10 and the corresponding cryptographic key. For example, based on the command from the host 10, the storage controller 110 may store data encoded through the cryptographic module 111 in the nonvolatile memory device 120 or may return data decoded through the cryptographic module 111 to the host 10.

The timer 112b may measure a time that passes from a point in time when a lifetime of a cryptographic key is set up. For example, the timer 112b may be configured to measure a length of a time, which passes from a point in time when a lifetime of a specific cryptographic key is set up, based on a clock signal. In an embodiment, the timer 112b may perform a time measure operation only when a power of the storage device 100 is turned on.

The key manager 112c may control the storage controller 110 based on a lifetime determined with respect to a cryptographic key. For example, the key manager 112c may calculate a remaining lifetime of a cryptographic key from a difference between the determined lifetime and a time measured by the timer 112b. Below, for brevity of description, the case where a value obtained by subtracting the time measured by the timer 112b from the determined lifetime is less than "0" is referred to as the case where a remaining lifetime is "0".

The key manager 112c may control the storage controller 110 to perform the data protect operation on a cryptographic key whose lifetime expires (e.g., whose remaining lifetime is "0"). Below, the case where a specific remaining lifetime is "0" is referred to as the case where a lifetime of a corresponding cryptographic key expires. In contrast, the case where the specific remaining lifetime is not "0" is referred to as the case where the lifetime of the corresponding cryptographic key does not expire.

That is, the key manager 112c may control the storage controller 110 to perform the data protect operation on a cryptographic key, when a time measured by the timer 112b is longer than a lifetime of the cryptographic key. For example, when a time passing after the first cryptographic key is set up is longer than a lifetime determined with respect to the first cryptographic key, the key manager 112c may determine that the lifetime of the first cryptographic key expires. In this case the key manager 112c may control the storage controller 110 to perform the data protect operation on the first cryptographic key.

In an embodiment, the key manager 112c may extend a lifetime stored in the key manager 112c under control of the host 10. The manner in which the key manager 112c extends a lifetime stored in the key manager 112c under control of the host 10 according to an embodiment will be described in detail with reference to FIG. 8.

In an embodiment, the key manager 112c may renew an expired lifetime under control of the host 10. The manner in which the key manager 112c renews a lifetime under control of the host 10 will be described in detail with reference to FIG. 9.

In an embodiment, the cryptographic module 111 and the security module 112 may be implemented in the form of hardware, software, or a combination thereof. For example, at least a part of the cryptographic module 111 or the security module 112 may be included in the storage controller 110 in the form of a separate circuit, device, or chip. Alternatively, at least a part of the cryptographic module 111 or the security module 112 may be implemented in the form of a software module that is loaded to the volatile memory device 115 by the processor 113. For brevity of description, an example in which the cryptographic module 111 and the security module 112 are separate components is illustrated in FIG. 2. However, embodiments of the present disclosure are not limited thereto. For example, part or all of the cryptographic module 111 and the security module 112 may be included in one or more of any other components.

FIG. 3 is a table illustrating the manner in which a storage controller of FIG. 2 operates based on a remaining lifetime according to an embodiment of the present disclosure.

Referring to FIGS. 1 to 3, the storage controller 110 may communicate with the host 10 based on various cryptographic keys. For example, the storage controller 110 may communicate with the host 10 based on cryptographic key "0x123ABC" (hereinafter referred to as a "first cryptographic key"), may communicate with the host 10 based on cryptographic key "0x123DEF" (hereinafter referred to as a "second cryptographic key"), may communicate with the host 10 based on cryptographic key "0x123GHI" (hereinafter referred to as a "third cryptographic key"), may communicate with the host 10 based on cryptographic key "0x123JKL" (hereinafter referred to as a "fourth cryptographic key"), and may communicate with the host 10 based on cryptographic key "0x123MNO" (hereinafter referred to as a "fifth cryptographic key").

The first to fifth cryptographic keys may be called through different key identifiers (Key ID). For example, the first cryptographic key may be called through key identifier "A", the second cryptographic key may be called through key identifier "B", the third cryptographic key may be called through key identifier "C", the fourth cryptographic key may be called through key identifier "D", and the fifth cryptographic key may be called through key identifier "E". However, the cryptographic keys and key identifiers described above are used for brevity of description, and embodiments of the present disclosure are not limited to a specific number of cryptographic keys, a specific size of a cryptographic key, or a specific size of a key identifier.

To call a cryptographic key, the host 10 may use a corresponding key identifier. For example, a command that the host 10 sends to the storage device 100 may include a key identifier instead of a cryptographic key. For example, when the host 10 sends the read command for data encoded by using the first cryptographic key to the storage device 100, the key identifier "A" may be included in the read command. In this case, the storage controller 110 may decode data stored in the nonvolatile memory device 120 by using the first cryptographic key. The storage controller 110 may provide the decoded data (e.g., raw data) to the host 10.

The storage controller 110 may set up or may not set up a lifetime of each of the first to fifth cryptographic keys under control of the host 10. Below, an embodiment in which the storage controller 110 does not set up a lifetime of the first cryptographic key and sets up lifetimes of the second to fifth cryptographic keys under control of the host 10 will be described as an example.

The storage controller 110 may not set up the lifetime of the first cryptographic key under control of the host 10. In this case, the storage device 100 may operate in an unprotect mode with regard to the first cryptographic key. That is, the storage device 100 may normally operate in response to a command received from the host 10. For example, when the read command including the key identifier "A" is received, regardless of a lifetime, the storage controller 110 may perform the read operation on the nonvolatile memory device 120. When the write command including the key identifier "A" is received, regardless of a lifetime, the storage controller 110 may perform the write operation on the nonvolatile memory device 120. When the erase command including the key identifier "A" is received, regardless of a lifetime, the storage controller 110 may erase data stored in the nonvolatile memory device 120.

The storage controller 110 may set up a lifetime of each of the second to fifth cryptographic keys under control of the host 10. In this case, the lifetimes of the second to fifth cryptographic keys may be identical to or different from each other, or the remaining lifetimes of the second to fifth cryptographic keys may be identical to or different from each other. For example, the remaining lifetime of the second cryptographic key may be "Ta", the remaining lifetime of the third cryptographic key may be "Tb", and the remaining lifetimes of the fourth and fifth cryptographic keys may be "0".

The storage device 100 may operate in a protect mode with regard to a cryptographic key whose remaining lifetime is greater than "0". For example, the storage device 100 may operate in the protect mode with regard to the second and third cryptographic keys. In this case, until the remaining lifetime is "0", the storage device 100 may operate in response to a command received from the host 10 (e.g., may operate normally). The operation of the storage device 100 that operates in response to a command received from the host 10 is similar to the above description, and thus, additional description will be omitted to avoid redundancy.

The storage device 100 may operate in a lock mode with regard to a cryptographic key whose remaining lifetime is "0". For example, the storage device 100 may operate in the lock mode with regard to the fourth and fifth cryptographic keys. In this case, the storage controller 110 may perform the data protect operation in response to a command related to the fourth or fifth cryptographic key.

The storage device 100 that operates in the lock mode may return an error in response to a request from a host. For example, the storage controller 110 may return an error in response to a command related to the fourth cryptographic key. That is, the storage controller 110 may return an error in response to a command including the key identifier "D".

Alternatively, the storage device 100 that operates in the lock mode may return a dummy response to a request from a host. For example, the storage controller 110 may return the dummy response to a command related to the fifth cryptographic key. That is, the storage controller 110 may return the dummy response to a command including the key identifier "E".

For example, when the read command including the key identifier "E" is received, the storage controller 110 may return garbage data to the host 10 instead of data stored in the nonvolatile memory device 120. When the write command including the key identifier "E" is received, the storage controller 110 may return a completion acknowledgment to the host 10 without writing data in the nonvolatile memory device 120. When the erase command including the key identifier "E" is received, the storage controller 110 may return a completion acknowledgment to the host 10 without erasing data stored in the nonvolatile memory device 120.

In an embodiment, whether to return an error or a dummy response to the host 10 when the storage controller 110 performs the data protect operation may be determined in the process of setting up a cryptographic key. That is, the host 10 may determine a way to protect data related to a specific cryptographic key.

In an embodiment, as the storage controller 110 sets up a lifetime of a cryptographic key under control of the host 10, the security of the storage device 100 may be increased. For example, after the host 10 is hacked, when a lifetime of a specific cryptographic key is not extended, the storage device 100 may enter the lock mode after the lifetime of the cryptographic key expires. In this case, because the access of the hacked host to data stored in the storage device 100 is blocked, the data of the storage device 100 may be protected even though a host is hacked.

In an embodiment, with regard to a cryptographic key whose lifetime expires, the storage controller 110 may return a dummy response to the host 10, and thus, the security of the storage device 100 may be increased. For example, when the hacked host sends the read command to the storage device 100, the hacked host may receive garbage data. In this case, the the hacked host may determine that data stored in the storage device 100 are damaged. Accordingly, the security of the storage device 100 may be increased.

Figure 4:
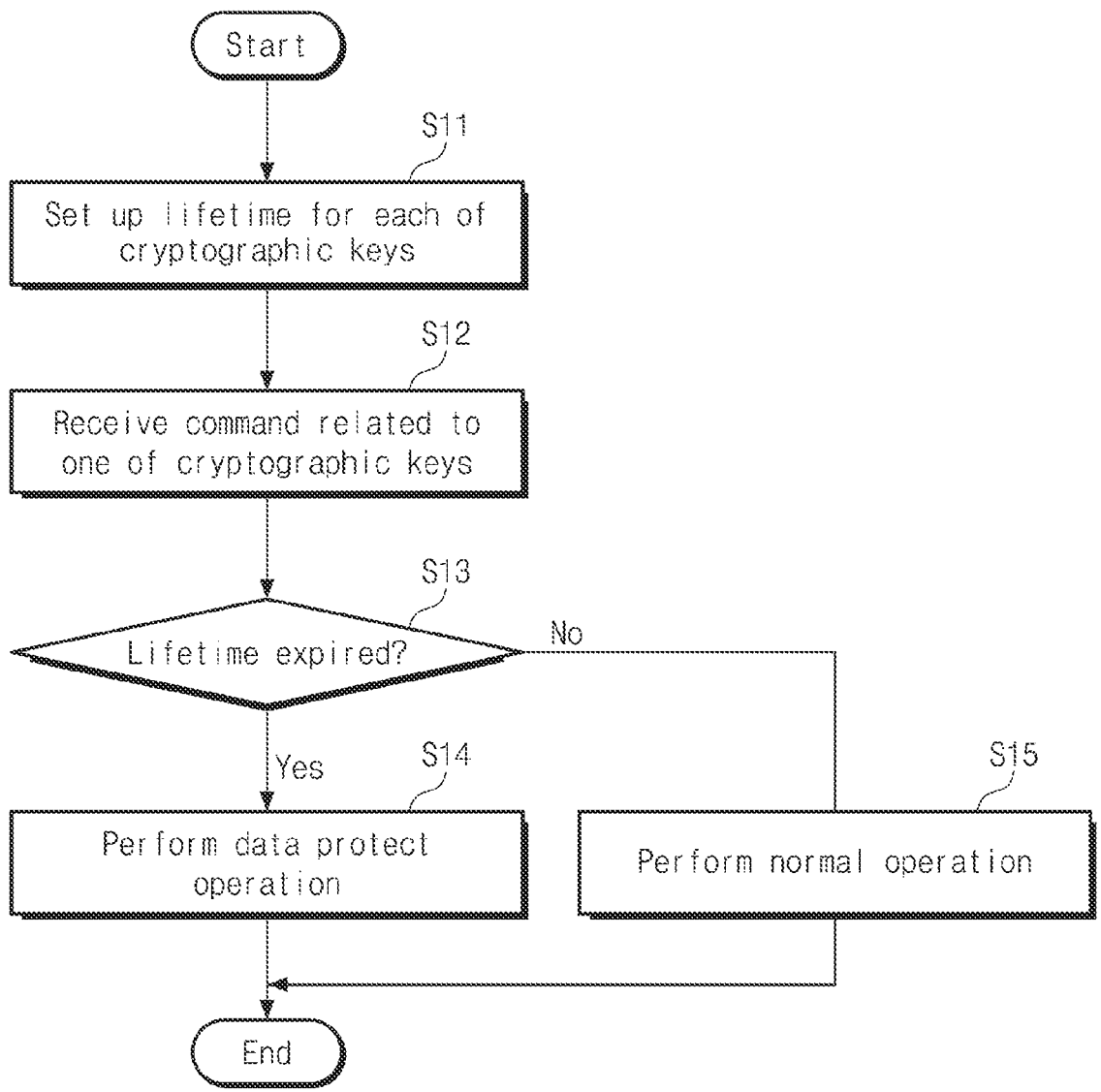
FIG. 4 is a flowchart illustrating an operation method of a storage device of FIG. 1 according to an embodiment of the present disclosure.

FIG. 4 is a flowchart illustrating an operation method of a storage device of FIG. 1 according to an embodiment of the present disclosure.

Referring to FIGS. 1 to 4, in operation S11, the storage device 100 may set up a lifetime for each of a plurality of cryptographic keys. For example, the storage controller 110 may set up a lifetime of a cryptographic key based on commands (hereinafter referred to as "setup commands") received from the host 10. In this case, each of the setup commands may include information about a cryptographic key, a key identifier, and a length of a lifetime.

In an embodiment, the storage controller 110 may be configured to set up lifetimes of some or all of the plurality of cryptographic keys that are used for communication with the host 10.

In operation S12, the storage device 100 may receive a command related to one of the plurality of cryptographic keys. For example, the storage controller 110 may receive a command related to a specific cryptographic key from the host 10. Below, for brevity of description, an embodiment in which the storage controller 110 receives a first command related to a first cryptographic key will be described as an example. In this case, it is assumed that the first command includes the first key identifier.

In operation S13, the storage device 100 may determine whether a lifetime of a cryptographic key related to a received command expires. For example, the storage controller 110 may determine whether the lifetime of the first cryptographic key expires. That is, the storage device 100 may determine an operating mode of the storage device 100 with regard to the first cryptographic key.

In an embodiment, when it is determined that the lifetime of the first cryptographic key expires, operation S14 may be performed. That is, when the storage device 100 operates in the lock mode with regard to the first cryptographic key (e.g., when a remaining lifetime of the first cryptographic key is "0"), operation S14 may be performed.

In an embodiment, when it is determined that the lifetime of the first cryptographic key does not expire, operation S15 may be performed. That is, when the storage device 100 operates in the protect mode with regard to the first cryptographic key (e.g., when the remaining lifetime of the first cryptographic key is greater than "0"), operation S15 may be performed.

In operation S14, the storage device 100 may perform the data protect operation. For example, the storage controller 110 may return a dummy response or an error in response to the first command.

In operation S15, the storage device 100 may perform the normal operation. For example, when the first command is the read command, the storage controller 110 may perform the read operation on the nonvolatile memory device 120. When the first command is the write command, the storage controller 110 may perform the write operation on the nonvolatile memory device 120. When the first command is the erase command, the storage controller 110 may erase data stored in the nonvolatile memory device 120.

Figure 5:
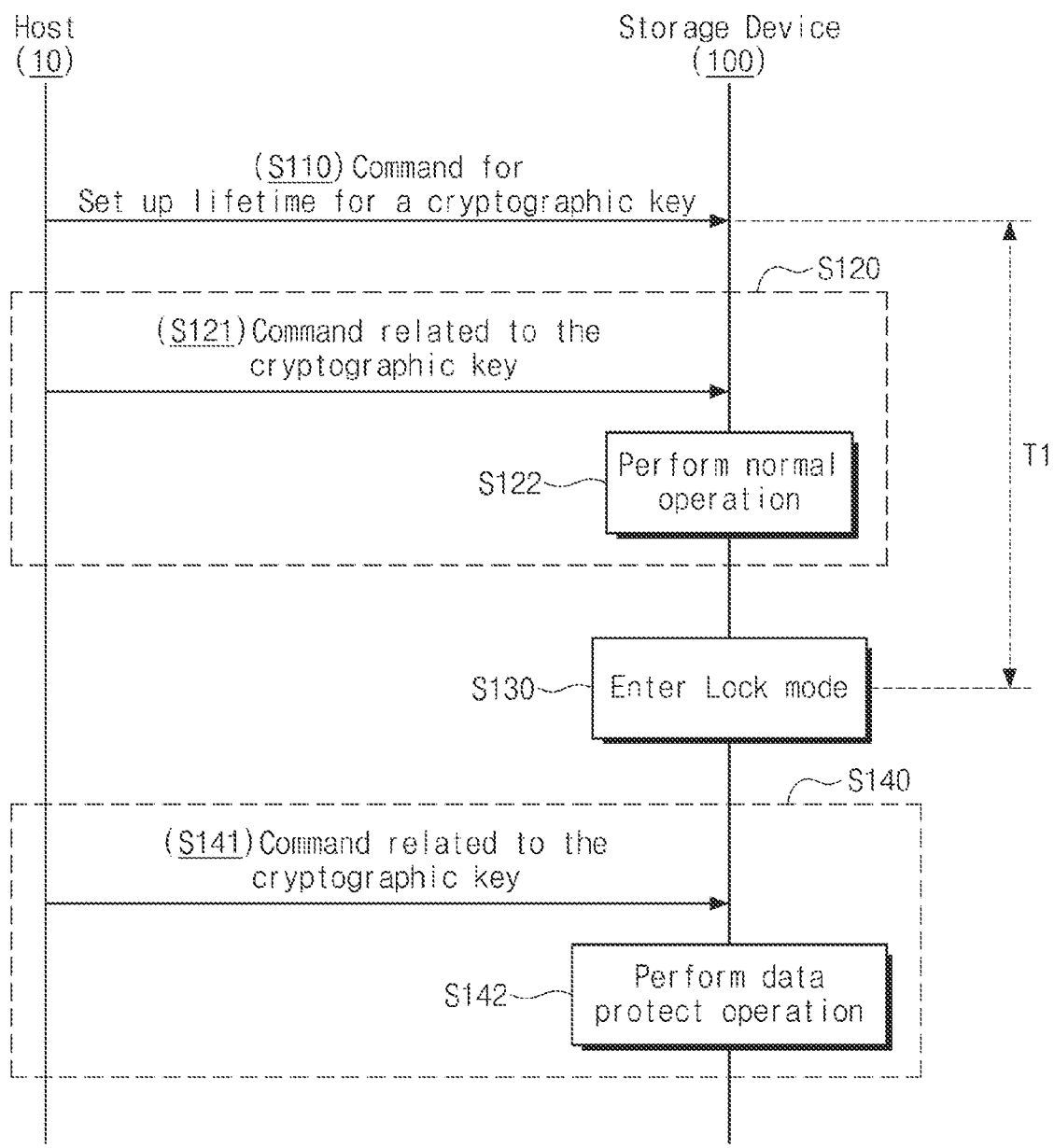
FIG. 5 is a flowchart illustrating an operation method of a storage device operating in response to a command issued from a host of FIG. 1 according to an embodiment of the present disclosure.

FIG. 5 is a flowchart illustrating an operation method of a storage device operating in response to a command issued from a host of FIG. 1 according to an embodiment of the present disclosure.

Referring to FIGS. 1 to 3 and 5, in operation S110, the host 10 may send a command (e.g., a setup command) for setting up a lifetime of a cryptographic key to the storage device 100. In this case, the storage device 100 may set up the lifetime of the cryptographic key based on the setup command.

Below, for brevity of description, it is assumed that a first key identifier and a lifetime of a first time T1 are set up for the first cryptographic key and the first cryptographic key is called through the first key identifier. For example, the setup command may include information about the first cryptographic key, the first key identifier, and the first time T1. However, embodiments of the present disclosure are not limited thereto. For example, a key identifier and a lifetime for a cryptographic key may be set up through separate commands. For example, the storage device 100 may receive a first setup command from the host 10 and may set up the first cryptographic key and the first key identifier for the first cryptographic key. Subsequently, the storage device 100 may receive a second setup command from the host 10 and may set up the lifetime for the first cryptographic key.

In an embodiment, in the case where lifetime information is not included in the setup command, the storage device 100 may set up a lifetime determined in advance with regard to a cryptographic key. For example, the host 10 may provide the storage device 100 with the first setup command including the first cryptographic key and the first key identifier corresponding to the first cryptographic key (e.g., lifetime information not being included in the first setup command). With regard to the first cryptographic key, the storage device 100 may set up a lifetime of a pre-determined time length in response to the first setup command.

In an embodiment, the setup command may include information about a cryptographic key, a key identifier for the cryptographic key, and a length of a lifetime.

Before a lifetime expires, in operation S120, the storage device 100 may operate in the protect mode. That is, the storage device 100 may operate in response to a command received from the host 10 until the first time T1 passes.

For example, operation S120 may include operation S121 and operation S122. In operation S121, the host 10 may send a command related to a cryptographic key to the storage device 100. For example, the host 10 may send a command including the first key identifier. In operation S122, the storage device 100 may perform the normal operation depending on the command received from the host 10. For example, when the read command is received, the storage device 100 may perform the read operation on the nonvolatile memory device 120. When the write command is received, the storage controller 110 may perform the write operation on the nonvolatile memory device 120. When the erase command is received, the storage controller 110 may perform the erase operation on data stored in the nonvolatile memory device 120.

In an embodiment, before a lifetime of a specific cryptographic key expires, the storage device 100 may extend the lifetime under control of the host 10. An embodiment in which a lifetime is extended will be described in detail with reference to FIG. 8.

When the lifetime expires, in operation S130, the storage device 100 may enter the lock mode with regard to the corresponding cryptographic key. For example, with regard to the first cryptographic key, the storage device 100 may enter the lock mode in response to the first time T1 passing.

After the lifetime expires, in operation S140, the storage device 100 may operate in the lock mode. That is, after the first time T1 passes, the storage device 100 may perform the data protect operation in response to a command received from the host 10 with regard to the first cryptographic key.

For example, operation S140 may include operation S141 and operation S142. In operation S141, the host 10 may send a command related to a cryptographic key to the storage device 100. For example, the host 10 may send a command including the first key identifier. In operation S142, the storage device 100 may perform the data protect operation for a cryptographic key in response to the command received from the host 10. For example, the storage device 100 may return an error or a dummy response to the host 10. The data protect operation of the storage device 100 will be described in detail with reference to FIGS. 6, 7A, and 7B.

In an embodiment, after a lifetime of a specific cryptographic key expires, the storage device 100 may renew the lifetime under control of the host 10. An embodiment related to renewing a lifetime will be described in detail with reference to FIG. 9.

In an embodiment, in the case where the host 10 is hacked, a lifetime of a cryptographic key may not be extended. In this case, the storage device 100 may operate in the lock mode. Accordingly, the hacked host may fail to access (e.g., read or modify) data related to a cryptographic key whose lifetime expires. That is, data related to a cryptographic key whose lifetime expires may be protected from the hacked host. Accordingly security of the storage device 100 may be increased.

In an embodiment, when an access to a cryptographic key whose lifetime expires is requested, the storage device 100 may be implemented to operate in the lock mode with regard to all cryptographic keys. For example, after the lifetime of the first cryptographic key expires, access related to the first cryptographic key may be requested from the host 10. In this case, the storage device 100 may operate in the lock mode with regard to both the first cryptographic key and the second cryptographic key. However, embodiments of the present disclosure are not limited thereto.

Figure 6:
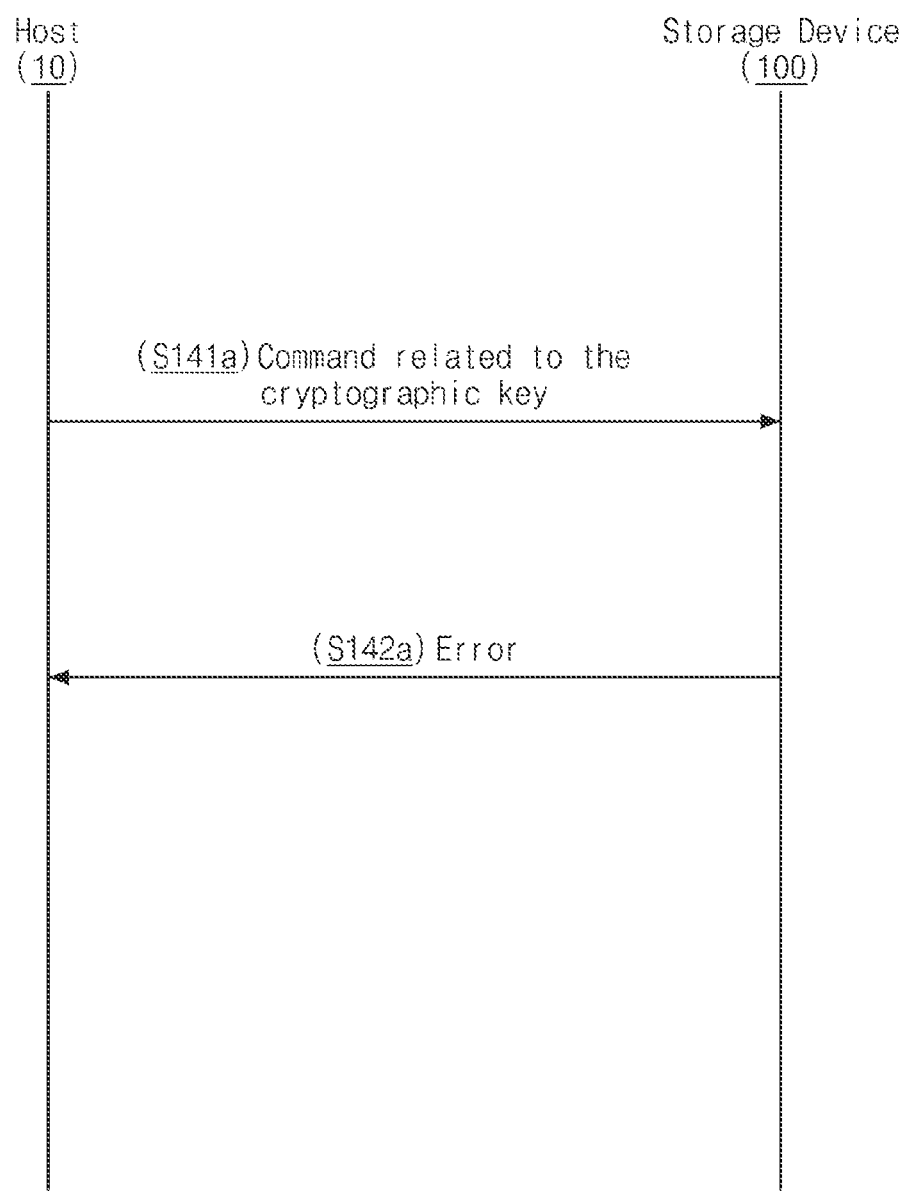
FIG. 6 is a diagram illustrating an operation S140 of FIG. 5 according to an embodiment of the present disclosure.

FIG. 6 is a diagram illustrating operation S140 of FIG. 5 according to an embodiment of the present disclosure.

An operation in which the storage device 100 receives a command of the host 10 and returns an error will be described with reference to FIG. 6. Referring to FIGS. 1 to 3, 5, and 6, operation S140 may include operation S141a and operation S142a. In this case, operation S141a may correspond to operation S141, and operation S142a may correspond to operation S142.

In operation S141a, the host 10 may send a command related to a cryptographic key to the storage device 100. In this case, the command that the host 10 sends may be related to a cryptographic key whose lifetime expires. For example, the command that the host 10 sends may include a key identifier (e.g., the first key identifier) associated with a cryptographic key (e.g., the first cryptographic key) whose lifetime expires. In an embodiment, the command that is sent in operation S141a may be one of various types of commands such as, for example, a read command, a write command, and an erase command.

In operation S142a, the storage device 100 may return an error to the host 10. For example, the storage device 100 may return an error with regard to all commands related to the first cryptographic key (or including the first key identifier).

Figure 7A:
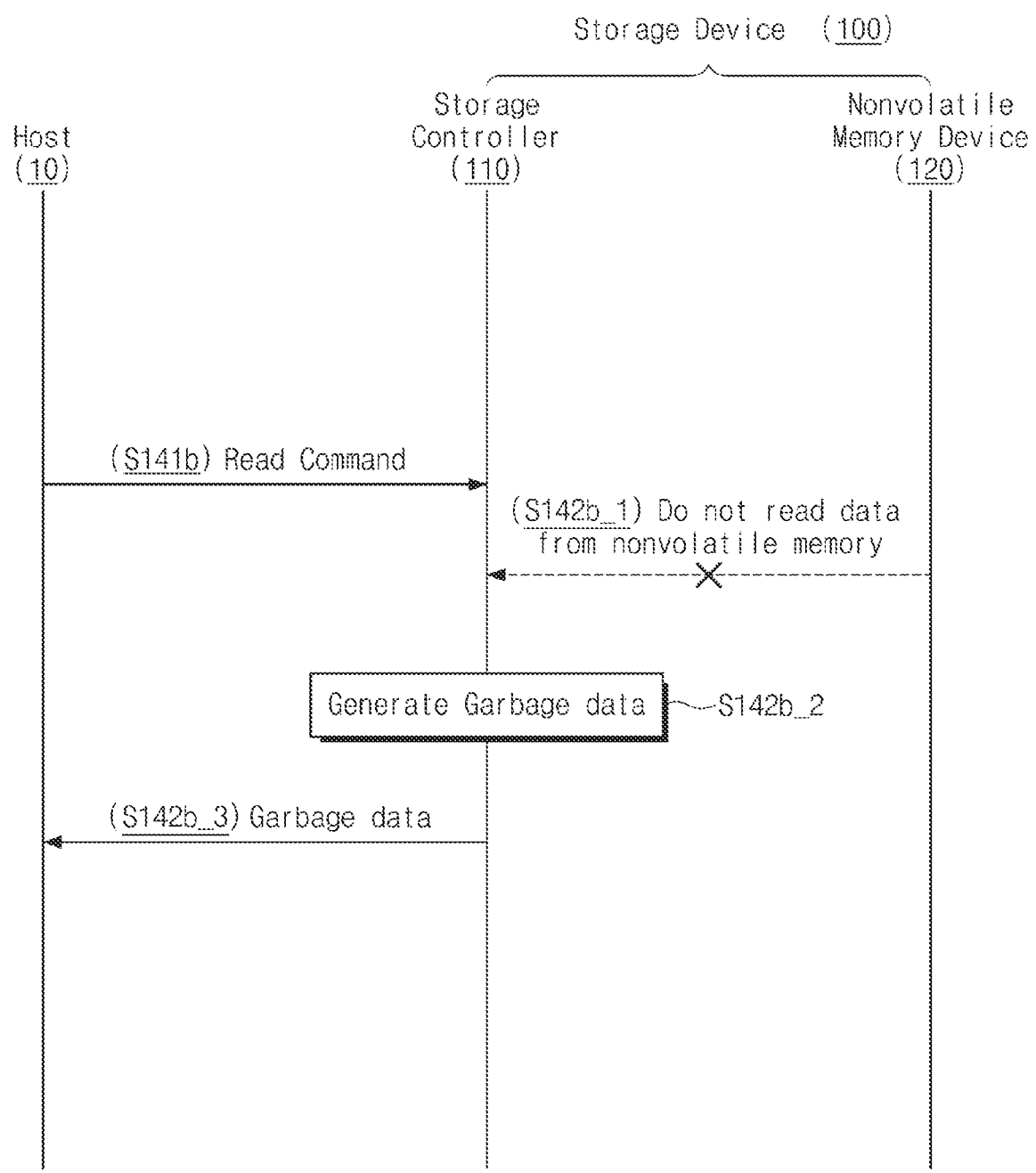
FIGS. 7A and 7B are diagrams illustrating an operation S140 of FIG. 5 according to an embodiment of the present disclosure.
Figure 7B:
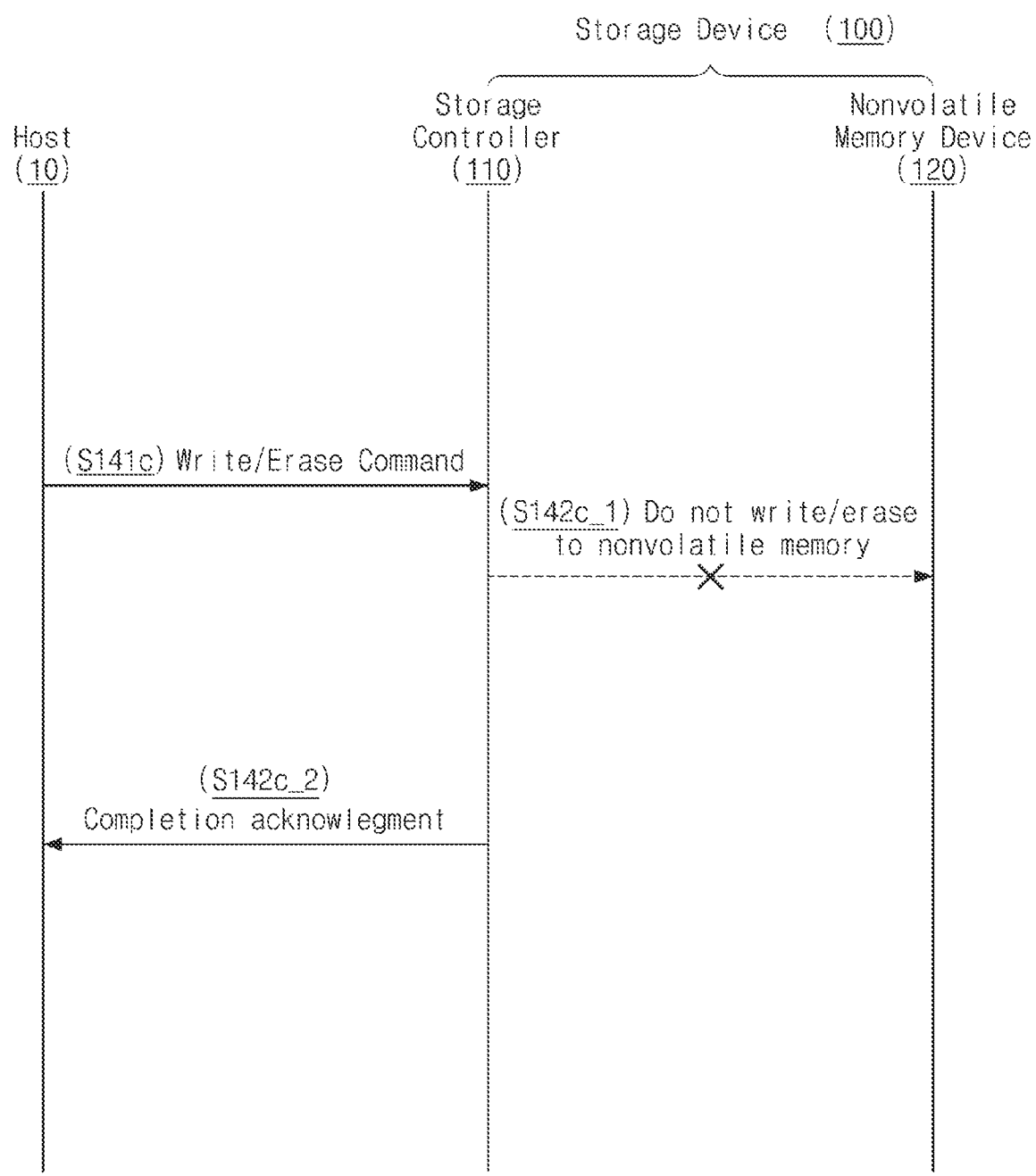

FIGS. 7A and 7B are diagrams illustrating operation S140 of FIG. 5 according to an embodiment of the present disclosure. An operation in which the storage device 100 receives a command of the host 10 and returns a dummy response will be described with reference to FIGS. 7A and 7B.

Referring to FIGS. 1 to 3, 5, and 7A, operation S140 may include operation S141b, operation S142b_1, operation S142b_2, and operation S142b_3. In this case, operation S141b may correspond to operation S141, and operation S142b_1 to S142b_3 may correspond to operation S142.

In operation S141b, the host 10 may send the read command to the storage controller 110. In this case, the command that the host 10 sends may be related to a cryptographic key whose lifetime expires. For example, the command that the host 10 sends may include a key identifier (e.g., the first key identifier) associated with a cryptographic key (e.g., the first cryptographic key) whose lifetime expires.

In operation S142b_1, the storage controller 110 does not read data from the nonvolatile memory device 120. That is, the storage controller 110 does not operate in response to the read command received from the host 10.

In operation S142b_2, the storage controller 110 may generate garbage data. In this case, the garbage data may be generated regardless of data related to the read command that the host 10 sends. For example, the garbage data may be independent of data stored at a physical address of the nonvolatile memory device 120, which corresponds to the read command from the host 10. For example, the garbage data may be random data.

In an embodiment, the storage controller 110 may generate the same garbage data with respect to the same read command. That is, the storage device 100 may be configured to repeatedly return the same garbage data in response to the same read command.

In operation S142b_3, the storage controller 110 may return the generated garbage data to the host 10. Accordingly, the hacked host may determine that data corresponding to the read command thus issued are damaged. In this case, the security of the storage device 100 may be increased.

Referring to FIGS. 1 to 3, 5, and 7B, operation S140 may include operation S141c, operation S142c_1, and operation S142c_2. In this case, operation S141c may correspond to operation S141, and operation S142c_1 and S142c_2 may correspond to operation S142.

In operation S141c, the host 10 may send the write command or the erase command to the storage controller 110. A configuration of the write command or the erase command is similar to that of the read command described with reference to FIG. 7A, and thus, additional description will be omitted to avoid redundancy.

In operation S142c_1, the storage controller 110 does not write data in the nonvolatile memory device 120 or does not erase data stored in the nonvolatile memory device 120. That is, the storage controller 110 does not operate in response to the write command or the erase command received from the host 10.

In operation S143c_2, the storage controller 110 may return a completion acknowledgment to the host 10. That is, the storage controller 110 may notify the host 10 that the command received from the host 10 is successfully processed. Accordingly, the hacked host may determine that the write command or the erase command thus issued is successfully processed. In this case, the security of the storage device 100 may be increased.

Figure 8:
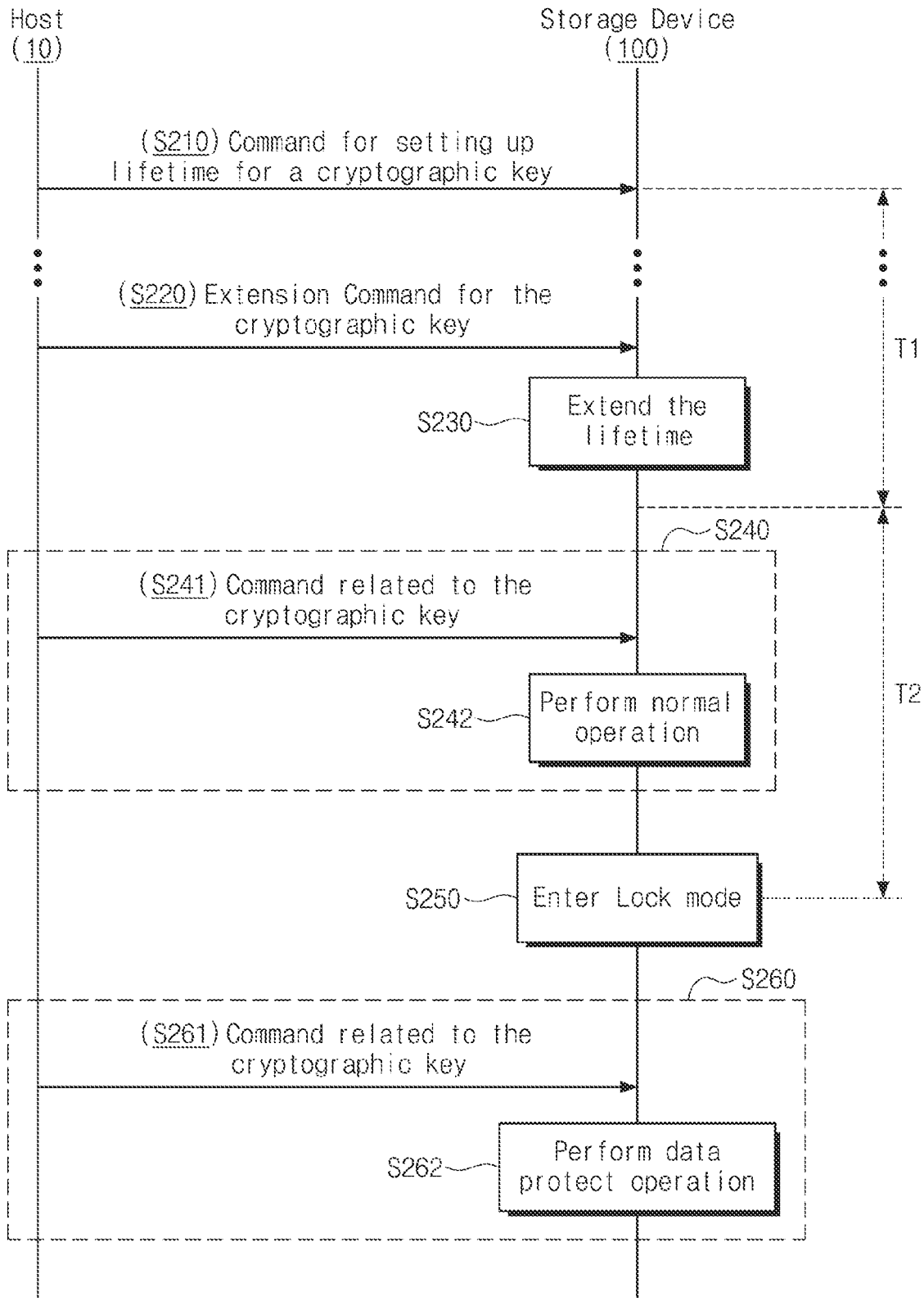
FIG. 8 is a flowchart illustrating an operation method of a storage device of FIG. 1, which extends a lifetime under control of a host, according to an embodiment of the present disclosure.

FIG. 8 is a flowchart illustrating an operation method of a storage device of FIG. 1, which extends a lifetime under control of a host, according to an embodiment of the present disclosure.

Referring to FIGS. 1 to 3 and 5 to 8, in operation S210, the host 10 may send the setup command to the storage device 100. Operation S210 is substantially the same as operation S110 described with reference to FIG. 5, and thus, additional description will be omitted to avoid redundancy. Below, for brevity of description, it is assumed that the storage device 100 sets up the lifetime of the first time T1 with respect to a first command based on the setup command.

Before the lifetime expires, in operation S220, the host 10 may send an extension command for a cryptographic key to the storage device 100. In this case, the extension command may indicate a command for requesting to extend a lifetime of a cryptographic key. For example, the host 10 may send the extension command for the first cryptographic key to the storage controller 110.

In an embodiment, the extension command may include a key identifier for a cryptographic key targeted for the extension of the lifetime, instead of the cryptographic key targeted for the extension of the lifetime. For example, the extension command for the first cryptographic key may include a first key identifier.

In operation S230, the storage device 100 may extend the lifetime based on the extension command from the host 10. For example, the storage device 100 may extend the lifetime of the first cryptographic key as much as a second time T2 in response to the extension command. In this case, the lifetime of the first cryptographic key present in the key storage 112a may be modified to a sum of the first time T1 and the second time T2.

In an embodiment, information about a length of the second time T2 may be included in the extension command provided in operation S220. Alternatively, the length of the second time T2 may be defined in the setup command provided in operation S210.

In an embodiment, the extension command may be encoded with a private key defined in advance between the host 10 and the storage device 100. For example, a key identifier and/or extension time information (e.g., information about the length of the second time T2) included in the extension command may be encoded with the private key. In this case, the probability that the key identifier and/or the extension time information is leaked may decrease.

Embodiments of the present disclosure are not limited to the manner in which the extension command is implemented, and a lifetime of a cryptographic key may be extended through various schemes determined between the host 10 and the storage device 100.

For example, the extension command may be implemented with a normal command (e.g., an NVM command) such as a read command or a write command, and not an admin command defined for lifetime extension. For example, the host 10 may send the first command including information about lifetime extension in some fields. The storage device 100 may operate based on the first command (e.g., may perform the read operation based on the first command) and may extend a lifetime of a cryptographic key related to the first command. In this case, instead of extending a lifetime through a separate admin command, the host 10 may continue to extend a lifetime through the normal command (e.g., a read command or a write command).

For another example, the extension command may be defined based on an access pattern by which the host 10 accesses a cryptographic key. For example, as described above, the extension command may not be implemented with the admin command defined for lifetime extension. Instead, the storage controller 110 may be configured to extend a lifetime when the host 10 accesses a specific cryptographic key repeatedly (or regularly).

Before the extended lifetime expires, in operation S240, the storage device 100 may operate in the protect mode. That is, the storage device 100 may operate normally, in response to a command received from the host 10, until the extended lifetime has expired. The operations of the host 10 and the storage device 100 in operation S240 are the same as those in operation S120 described above, and thus, additional description will be omitted to avoid redundancy. For example, operation S240 may include operation S241 being the same as operation S121 and operation S242 being the same as operation S122.

When the extended lifetime expires, in operation S250, the storage device 100 may enter the lock mode with regard to the corresponding cryptographic key. For example, with regard to the first cryptographic key, the storage device 100 may enter the lock mode when both the first time T1 and the second time T2 pass.

After the extended lifetime expires, in operation S260, the storage device 100 may operate in the lock mode. That is, after both the first time T1 and the second time T2 pass, the storage device 100 may perform the data protect operation with respect to a command received from the host 10. The operations of the host 10 and the storage device 100 in operation S260 are the same as those in operation S140 described above, and thus, additional description will be omitted to avoid redundancy. For example, operation S260 may include operation S261 being the same as operation S141 and operation S262 being the same as operation S142.

That is, after the host 10 is hacked, when a lifetime of a specific cryptographic key is not extended, the storage device 100 may enter the lock mode after the lifetime of the cryptographic key expires. In this case, because the access of the hacked host to data stored in the storage device 100 is blocked, the data of the storage device 100 may be protected even though the host is hacked.

In an embodiment, the storage device 100 may collectively extend a plurality of lifetimes of a plurality of cryptographic keys under control of the host 10. For example, the storage device 100 may extend the lifetime of the first cryptographic key and the lifetime of the second cryptographic key in response to the extension command from the host 10.

Figure 9:
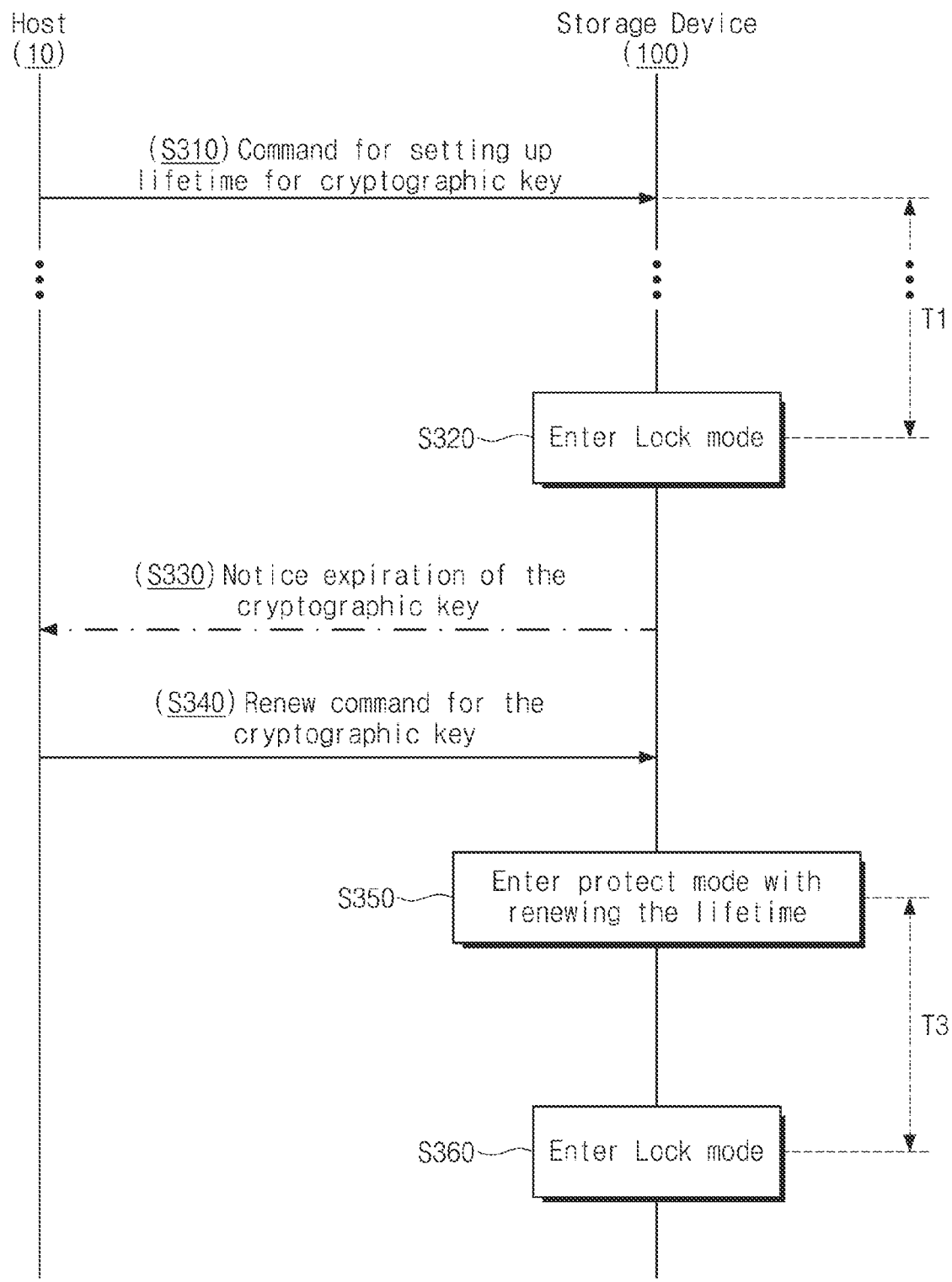
FIG. 9 is a flowchart illustrating an operation method of a storage device of FIG. 1, which renews a lifetime under control of a host, according to an embodiment of the present disclosure.

FIG. 9 is a flowchart illustrating an operation method of a storage device of FIG. 1, which renews a lifetime under control of a host, according to an embodiment of the present disclosure.

Referring to FIGS. 1 to 3 and 5 to 9, in operation S310, the host 10 may send the setup command to the storage device 100. When the extended lifetime expires, in operation S320, the storage device 100 may enter the lock mode. Operation S310 is substantially the same as operation S110 and operation S210 described above, and operation S320 is substantially the same as operation S130 and operation S250 described above. Thus, additional description will be omitted to avoid redundancy. Below, for brevity of description, an operation in which the storage device 100 renews a lifetime of the first cryptographic key will be described as an example.

In an embodiment, the storage device 100 may perform one or more lifetime extension operations between operation S310 and operation S320. For example, an operation in which the storage device 100 receives the extension command for the first cryptographic key from the host 10 and extends a lifetime of the first cryptographic key may be further performed between operation S310 and operation S320.

In operation S330, the storage device 100 may notify the host 10 of a cryptographic key whose lifetime expires. For example, the storage device 100 may notify the host 10 that the lifetime for the first cryptographic key expires. In this case, the storage device 100 may notify the host 10 of the lifetime expiration based on an interrupt manner. However, embodiments of the present disclosure are not limited to the manner in which the storage device 100 notifies the host 10 of the lifetime expiration.

In operation S340, the host 10 may send a renew command for a cryptographic key whose lifetime expires, to the storage device 100. In this case, the renew command may include re-authentication information. For example, the renew command may include a key identifier for a cryptographic key whose lifetime expires.

In an embodiment, the renew command may be implemented to be the same as the extension command described with reference to operation S220. That is, in an embodiment, the renew command may be identical to the extension command. For example, the renew command may be encoded based on a private key.

Embodiments of the present disclosure are not limited to the manner in which the renew command is implemented, and a lifetime of a cryptographic key may be renewed through various schemes determined between the host 10 and the storage device 100. Various embodiments related to the manner in which the renew command is implemented are similar to that described with reference to FIG. 8, and thus, additional description will be omitted to avoid redundancy. In an embodiment, operation S340 may be performed after power of a storage device is turned off after operation S320 and is then again turned on. For example, after the storage device 100 that enters the lock mode with regard to a specific key is rebooted, the storage device 100 may perform the data protect operation before receiving re-authentication information.

In an embodiment, operation S330 may be omitted. For example, in an embodiment, after operation S320, the storage device 100 does not notify the host 10 of the lifetime expiration. In this case, after operation S320, the storage device 100 may perform the data protect operation until the renew command is received from the host 10.

In operation S350, the storage device 100 may renew a lifetime of a cryptographic key corresponding to the renew command and may enter the protect mode. For example, the storage device 100 may set up the lifetime of the first cryptographic key with a third time T3. In this case, a length of the third time T3 may be about equal to or different from the length of the first time T1.

When the renewed lifetime expires, in operation S360, the storage device 100 may again enter the lock mode. For example, in the case where the third time T3 passes, the storage device 100 may enter the lock mode with regard to the first cryptographic key. In this case, the storage device 100 may perform the data protect operation with regard to the first cryptographic key.

In an embodiment, in the case where a plurality of lifetimes of a plurality of cryptographic keys expire, the storage device 100 may collectively renew the plurality of lifetimes under control of the host 10. For example, the storage device 100 may renew the lifetime of the first cryptographic key and the lifetime of the second cryptographic key in response to the renew command from the host 10.

Figure 10:
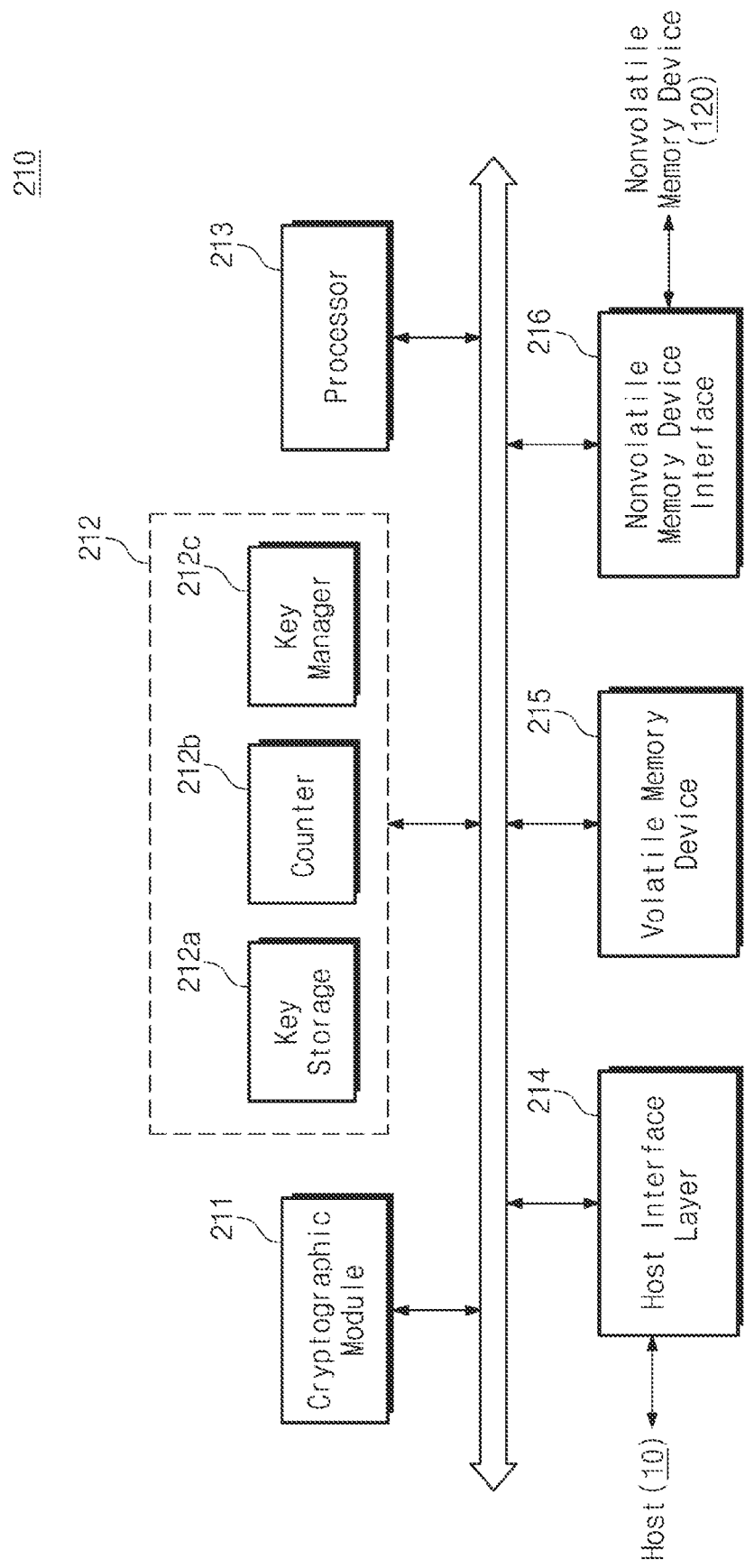
FIG. 10 is a block diagram illustrating a storage controller according to an embodiment of the present disclosure.

FIG. 10 is a block diagram illustrating a storage controller according to an embodiment of the present disclosure. For brevity, the description given with reference to the above components will be omitted to avoid redundancy.

Referring to FIG. 10, a storage controller 210 may include a security module 212. The storage controller 210 may include a cryptographic module 211, the security module 212, a processor 213, a host interface layer 214, a volatile memory device 215, and a nonvolatile memory device interface 216. The cryptographic module 211, the security module 212, the processor 213, the host interface layer 214, the volatile memory device 215, and the nonvolatile memory device interface 216 may be connected to each other via a bus. The cryptographic module 211, the processor 213, the host interface layer 214, the volatile memory device 215, and the nonvolatile memory device interface 216 are described with reference to FIG. 2, and thus, additional description will be omitted to avoid redundancy.

In an embodiment, the security module 112 described with reference to FIGS. 1 to 9 may perform the data protect operation based on a lifetime of a cryptographic key. In contrast, the security module 212 of FIG. 10 may be configured to set up durability for an access of a cryptographic key to perform the data protect operation. That is, the security module 212 of FIG. 10 may set up a limit on the number of accesses of the host 10 to a cryptographic key.

For example, the security module 212 may include key storage 212a, a counter 212b, and a key manager 212c.

The key storage 212a may store a variety of information related to a cryptographic key that is used for communication with the host 10. For example, the key storage 212a may store a cryptographic key, a key identifier (Key ID) for the cryptographic key, and the durability set up with respect to the cryptographic key.

The counter 212b may count the number of accesses to a cryptographic key. That is, the counter 212b may increase a corresponding counter value when an access to a specific cryptographic key is made. For example, when the access to the first cryptographic key is requested from the host 10, the counter 212b may increase a counter value for the first cryptographic key.

In an embodiment, the access may refer to a command provided from the host 10 with regard to a cryptographic key. For example, the access to the first cryptographic key may refer to commands each including a first key identifier. That is, the access may include various types of commands such as a read command, a write command, and an erase command.

The key manager 212c may control the storage controller 210 based on the durability set up with respect to a cryptographic key. For example, when a counter value measured by the counter 212b is greater than the durability, the key manager 212c may control the storage controller 110 to perform the data protect operation. For example, when a counter value for the first cryptographic key is greater than the durability for the first cryptographic key, the key manager 212c may control the storage controller 110 to perform the data protect operation with regard to the first cryptographic key.

FIG. 11 is a table illustrating the manner in which a storage controller of FIG. 10 operates based on a counter value, according to an embodiment of the present disclosure.

Referring to FIGS. 10 to 11, the storage controller 210 may communicate with the host 10 based on various cryptographic keys. For example, the storage controller 210 may communicate with the host 10 based on cryptographic key "0x456ABC" (hereinafter referred to as a "first cryptographic key"), may communicate with the host 10 based on cryptographic key "0x456DEF" (hereinafter referred to as a "second cryptographic key"), may communicate with the host 10 based on cryptographic key "0x456GHI" (hereinafter referred to as a "third cryptographic key"), may communicate with the host 10 based on cryptographic key "0x456JKL" (hereinafter referred to as a "fourth cryptographic key"), and may communicate with the host 10 based on cryptographic key "0x456MNO" (hereinafter referred to as a "fifth cryptographic key").

The first to fifth cryptographic keys may be called through different key identifiers. The first to fifth cryptographic keys may be respectively called through key identifiers "F", "G", "H", "I", and "J".

The storage controller 210 may set up or may not set up the durability of each of the first to fifth cryptographic keys under control of the host 10. Below, an embodiment in which the storage controller 210 does not set up the durability of the first cryptographic key and sets up the durability of each of the second to fifth cryptographic keys will be described as an example.

The storage controller 210 may not set up the lifetime of the first cryptographic key under control of the host 10. In this case, the storage device 100 may operate in the unprotect mode with regard to the first cryptographic key.

The storage device 100 may operate in a protect mode with regard to a cryptographic key whose durability is greater than or about equal to a corresponding counter value. For example, with regard to the second cryptographic key (in which the durability Na is greater than "0") and the third cryptographic key (in which the durability Nb is same as a counter value Nb), the key manager 212c may allow the storage device 100 to operate in the protect mode.

The storage device 100 may operate in the lock mode with regard to a cryptographic key whose durability is less than a corresponding counter value. For example, the storage device 100 may operate in the lock mode with regard to the fourth and fifth cryptographic keys.

In an embodiment, the case where the durability of a specific cryptographic key is less than a corresponding counter value may refer to the case where the durability of the cryptographic key is exhausted (or worn out).

Methods in which the storage device 100 operates in the unprotect mode, the protect mode, and the lock mode are similar to those described with reference to FIGS. 1 to 6 and 7A and 7B, and thus, additional description will be omitted to avoid redundancy.

In an embodiment, before the durability of the specific cryptographic key is exhausted, under control of the host 10, the storage device 100 may increase the durability or may decrease a counter value. For example, in response to a recovery command received from the host 10, the storage device 100 may increase the durability of the corresponding cryptographic key or may decrease a counter value.

In an embodiment, the recovery command may include a key identifier related to a cryptographic key targeted for an increase in durability or a decrease in a counter value.

In an embodiment, the recovery command may be encoded with a private key. For example, the recovery command may include an encoded key identifier.

Figure 12:
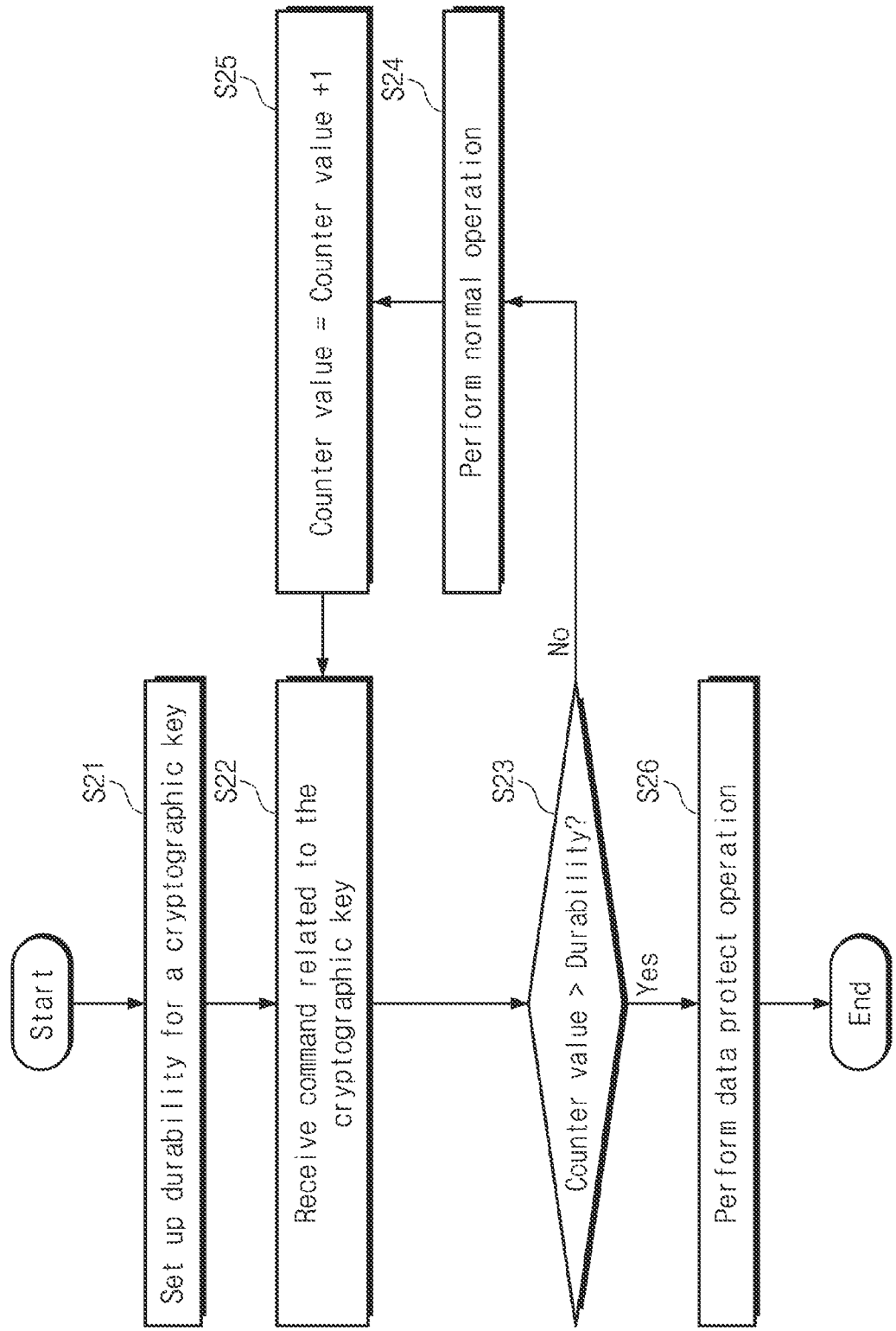
FIG. 12 is a flowchart illustrating an operation method of a storage device of FIG. 1, which includes a storage controller of FIG. 10, according to an embodiment of the present disclosure.

FIG. 12 is a flowchart illustrating an operation method of a storage device of FIG. 1, which includes a storage controller of FIG. 10, according to an embodiment of the present disclosure.

Referring to FIGS. 1 and 10 to 12, in operation S21, the storage device 100 may set up the durability of a cryptographic key under control of the host 10. Below, an embodiment in which the durability of the first cryptographic key is set up will be described as an example.

In operation S22, the storage device 100 may receive a command related to a cryptographic key whose durability is set up. That is, the storage device 100 may receive an access related to a cryptographic key from the host 10. For example, the storage device 100 may receive a command including the key identifier corresponding to the first cryptographic key.

In operation S23, the storage device 100 may compare the durability and a counter value. For example, the key manager 212c may compare the durability of the first cryptographic key with a counter value related to the first cryptographic key.

In an embodiment, when the counter value is less than or about equal to the durability, operation S24 and operation S25 may be performed. In operation S24, the storage device 100 may perform the normal operation. That is, the storage device 100 may operate in response to the command received from the host 10. For example, when the command received in operation S22 is the read command, the storage controller 110 may read data from the nonvolatile memory device 120.

In operation S25, the storage device 100 may increase the counter value by "1". For example, the counter 212b may increase the counter value related to the first cryptographic key by "1".

In an embodiment, when the counter value is greater than the durability, operation S26 may be performed. In operation S26, the storage device 100 may perform the data protect operation. For example, the storage controller 210 may perform the data protect operation with regard to the first cryptographic key.

In an embodiment, as the storage controller 210 sets up the durability of a cryptographic key, the security of the storage device 100 may be increased. For example, after the host 10 is hacked, when the recovery command for a specific cryptographic key is not received, the storage device 100 may enter the lock mode after the durability of the cryptographic key is exhausted (or worn out). In this case, because the access of the hacked host to data stored in the storage device 100 is blocked, the data of the storage device 100 may be protected even though a host is hacked.

Figure 13:
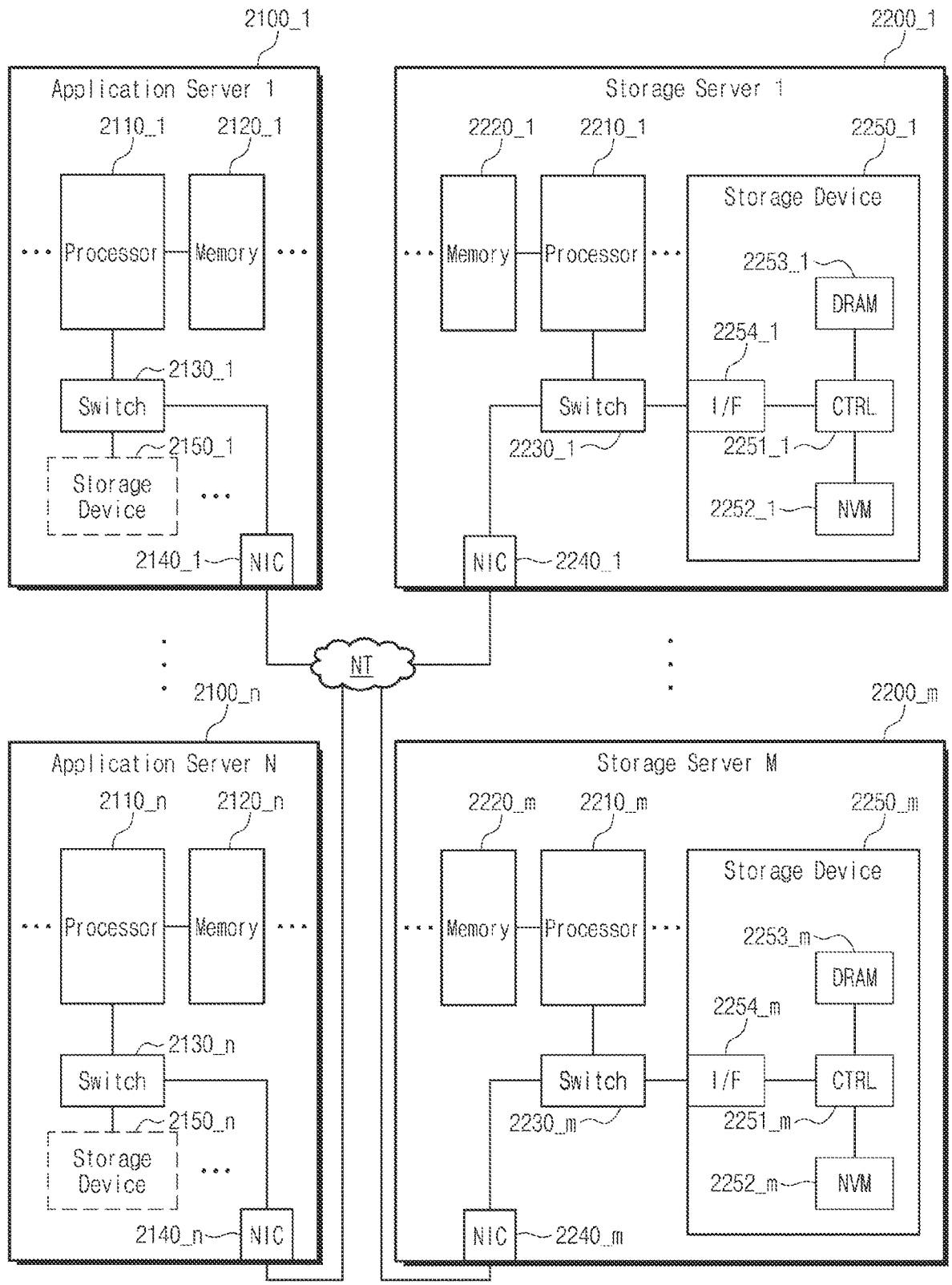
FIG. 13 is a block diagram illustrating an example of a data center to which a storage device according to an embodiment of the present disclosure is applied.

FIG. 13 is a diagram of a data center 2000 to which a memory device is applied, according to an embodiment.

Referring to FIG. 13, the data center 2000 may be a facility that collects various types of pieces of data and provides services, and may be referred to as a data storage center. The data center 2000 may be a system for operating a search engine and a database, and may be a computing system used by companies, such as, for example, banks, or government agencies. The data center 2000 may include application servers 2100_1 to 2100_n and storage servers 2200_1 to 2200_m, in which each of n and m is a positive integer. The number of application servers 2100_1 to 2100_n and the number of storage servers 2200_1 to 2200_m may be variously selected according to embodiments. The number of application servers 2100_1 to 2100_n may be different from the number of storage servers 2200_1 to 2200m.

Below, for convenience of description, an embodiment of the first storage server 2200_1 will be described. Each of the other storage servers 2200_2 to 2200_m and the plurality of application servers 2100_1 to 2100_n may have a similar configuration or structure of the first storage server 2200_1.

The storage server 2200_1 may include at least one of a processor 2210_1, a memory 2220_1, a network interface card (NIC) 2240_1, and a storage device 2250_1. The processor 2210_1 may control all operations of the storage server 2200_1, access the memory 2220_1, and execute instructions and/or data loaded in the memory 2220_1. The memory 2220_1 may be, for example, a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM).

In some embodiments, the numbers of processors 2210_1 and memories 2220_1 included in the storage server 2200_1 may be variously selected. In an embodiment, the processor 2210_1 and the memory 2220_1 may provide a processor-memory pair. In an embodiment, the number of processors 2210_1 may be different from the number of memories 2220_1. The processor 2210_1 may include a single-core processor or a multi-core processor.

The switch 2230_1 may selectively connect the processor 2210_1 to the storage device 2250_1 or selectively connect the NIC 2240_1 to the storage device 2250_1 via the control of the processor 2210_1.

The NIC 2240_1 may be configured to connect the first storage server 2200_1 with a network NT. In an embodiment, the NIC 2240_1 may include a network interface card and a network adaptor. The NIC 2240_1 may be connected to the network NT by, for example, a wired interface, a wireless interface, a BLUETOOTH interface, or an optical interface. The NIC 2240_1 may include an internal memory, a digital signal processor (DSP), and a host bus interface, and may be connected to the processor 2210_1 and/or the switch 2230_1 through the host bus interface. The host bus interface may be implemented as one of the above-described examples of the interface 2254_1 such as, for example, ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. In an embodiment, the NIC 2240_1 may be integrated with at least one of the processor 2210_1, the switch 2230_1, and the storage device 2250_1.

The storage device 2250_1 may store or read out data under the control of the processor 2210_1. The storage device 2250_1 may include a controller 2251_1, a nonvolatile memory 2252_1, DRAM 2253_1, and an interface 2254_1. In an embodiment, the storage device 2250_1 may include a secure element (SE) for security or privacy.

The controller 2251_1 may control all operations of the storage device 2250_1. In an embodiment, the controller 2251_1 may include SRAM. The controller 2251_1 may write data to the nonvolatile memory 2252_1 in response to a write command or read data from the nonvolatile memory device 2252_1 in response to a read command. In an embodiment, the controller 2251_1 may be configured to control the nonvolatile memory 2252_1 based on a Toggle interface or an ONFI interface.

The DRAM 2253_1 may temporarily store (or buffer) data to be written to the nonvolatile memory 2252_1 or data read from the nonvolatile memory 2252_1. Also, the DRAM 2253_1 may store data utilized for the controller 2251_1 to operate, such as, for example, metadata or mapping data. The interface 2254_1 may provide a physical connection between the at least one of the processor 2210_1, the memory 2220_1, the network interface card (NIC) 2240_1, and the controller 2251_1. In an embodiment, the interface 2254_1 may be implemented using a direct attached storage (DAS) scheme in which the storage device 2250_1 is directly connected to a dedicated cable. In an embodiment, the interface 2254_1 may be implemented by using various interface schemes, such as, for example, ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The above configuration of the storage server 2200_1 is merely an example, and embodiments of the present disclosure are not limited thereto. The above configuration of the storage server 2200_1 may be applied to each of other storage servers or the plurality of application servers. In an embodiment, in each of the plurality of application servers 2100_1 to 2100_n, the storage device may be selectively omitted.

The application servers 2100_1 to 2100_n may communicate with the storage servers 2200_1 to 2200_m through the network NT. The network NT may be implemented by using, for example, a fiber channel (FC) or Ethernet. In this case, the FC may be a medium used for relatively high-speed data transmission and may use an optical switch with high performance and high availability. The storage servers 2200_1 to 2200_m may be provided as, for example, file storages, block storages, or object storages according to an access method of the network NT.

In an embodiment, the network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In an embodiment, the network NT may be a general network, such as a TCP/IP network. For example, the network NT may be implemented according to a protocol, such as, for example, FC over Ethernet (FCoE), network attached storage (NAS), and NVMe over Fabrics (NVMe-oF).

In an embodiment, at least one of the plurality of application servers 2100_1 to 2100_n may be configured to access at least another one of the plurality of application servers 2100_1 to 2100_n or at least one of the plurality of storage servers 2200_1 to 2200_m.

For example, the application server 2100_1 may store data, which is requested by a user or a client to be stored, in one of the storage servers 2200_1 to 2200_m through the network NT. Also, the application server 2100_1 may obtain data, which is requested by the user or the client to be read, from one of the storage servers 2200_1 to 2200_m through the network NT. For example, the application server 2100_1 may be implemented as a web server or a database management system (DBMS).

The application server 2100_1 may access a memory 2120_n or a storage device 2150_n, which is included in another application server 2100_n, through the network NT. Alternatively, the application server 2100_1 may access memories 2220_1 to 2220_m or storage devices 2250_1 to 2250_m, which are included in the storage servers 2200_1 to 2200_m, through the network NT. Thus, the application server 2100_1 may perform various operations on data stored in application servers 2100_1 to 2100_n and/or the storage servers 2200_1 to 2200_m. For example, the application server 2100_1 may execute an instruction for moving or copying data between the application servers 2100_1 to 2100_n and/or the storage servers 2200_1 to 2200_m. In this case, the data may be moved from the storage devices 2250_1 to 2250_m of the storage servers 2200_1 to 2200_m to the memories 2120_1 to 2120_n of the application servers 2100_1 to 2100_n directly or through the memories 2220_1 to 2220_*m* of the storage servers 2200_1 to 2200_*m*. The data moved through the network NT may be data encrypted for security or privacy.

In an embodiment, each of the storage servers 2200_1 to 2200_*m* or the storage devices 2150_1 to 2150_*n* and 2250_1 to 2250_*m* may include a secure module. For example, at least one of the storage servers 2200_1 to 2200_*m* or the storage devices 2150_1 to 2150_*n* and 2250_1 to 2250_*m* may be configured to perform the data protect operation with reference to a cryptographic key, based on the method described with reference to FIGS. 1 to 12.

According to embodiments of the present disclosure, a storage device may set up a lifetime or durability for each cryptographic key. Accordingly, even though a host is hacked, data stored in the storage device may be prevented from being leaked and damaged. That is, according to embodiments of the present disclosure, a storage device with increased security and an operation method thereof are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a storage device, which includes a nonvolatile memory device and is configured to communicate with a host based on a cryptographic key, the method comprising:
    setting up a first key identifier and a first lifetime for a first cryptographic key, based on a first command received from the host; and
    after the first lifetime expires, when a second command including the first key identifier is received from the host, performing a data protect operation regarding to the first cryptographic key,
    wherein performing the data protect operation comprises returning a dummy response to the host in response to the second command,
    wherein, when the second command is a read command, the dummy response returned to the host comprises randomly generated garbage data that is independent of data stored at a physical address of the storage device which corresponds to the read command.

2. The method of claim 1, further comprising:
    before the first lifetime expires, extending the first lifetime for the first cryptographic key in response to an extension command received from the host.

3. The method of claim 2, wherein the extension command comprises the first key identifier encoded with a private key shared between the host and the storage device.

4. The method of claim 2, further comprising:
    after the first lifetime expires, receiving a renew command for the first cryptographic key from the host; and
    renewing the first lifetime in response to the renew command.

5. The method of claim 4, wherein the renew command is identical to the extension command.

6. The method of claim 1, further comprising:
    setting up a second key identifier and a second lifetime for a second cryptographic key, based on a third command received from the host; and
    after the second lifetime expires, when a fourth command comprising the second key identifier is received from the host, performing the data protect operation on the second cryptographic key.

7. The method of claim 6, further comprising:
    before the first and second lifetimes expire, extending the first lifetime and the second lifetime in response to an extension command received from the host.

8. A storage device, comprising:
    a nonvolatile memory device; and
    a storage controller configured to communicate with a host based on a cryptographic key and to control the nonvolatile memory device under control of the host,
    wherein the storage controller is configured to:
    set up a first lifetime of a first cryptographic key provided by the host; and
    return a dummy response to the host, in response to receiving a first command related to the first cryptographic key from the host after the first lifetime expires,
    wherein, when the first command is a read command, the dummy response returned to the host comprises randomly generated garbage data that is independent of data stored at a physical address of the storage device which corresponds to the read command.

9. The storage device of claim 8, wherein the storage controller is further configured to:
    store the first cryptographic key and the first lifetime;
    measure an elapsed time after the first lifetime is set up; and
    determine whether the first lifetime expires.

10. The storage device of claim 8, wherein the storage controller is further configured to:
    before the first lifetime expires, extend the first lifetime in response to receiving an extension command for the first cryptographic key from the host.

11. The storage device of claim 10, wherein the storage device is further configured to store a first key identifier related to the first cryptographic key, and
    wherein the extension command comprises the first key identifier encoded with a private key.

12. The storage device of claim 8, wherein the storage controller is further configured to:
    set up a second lifetime of a second cryptographic key provided by the host; and
    return an error or garbage data to the host in response to receiving a second command related to the second cryptographic key from the host after the second lifetime expires.

13. A storage system, comprising:
    a storage device comprising a nonvolatile memory device; and
    a host configured to send a first command for setting up a first cryptographic key, a first key identifier for the first cryptographic key, and a first lifetime for the first cryptographic key to the storage device,
    wherein, when an access to the first cryptographic key is requested from the host after the first lifetime expires, the storage device is configured to return an error of a dummy response to the host,
    wherein, when the access is a read command comprising the first key identifier, the dummy response comprises randomly generated garbage data that is independent of data stored at a physical address of the nonvolatile memory device which corresponds to the read command.

14. The storage system of claim 13, wherein the storage device is configured to:

store the first cryptographic key and the first lifetime;
measure an elapsed time after the first lifetime is set up; and
determine whether the first lifetime expires.

15. The storage system of claim 13, wherein, before the first lifetime expires, the host sends a second command for extending the first lifetime.

\* \* \* \* \*